United States Patent [19] [11] Patent Number: 4,481,834
Sato et al. [45] Date of Patent: Nov. 13, 1984

[54] BALANCE DEVICE FOR A MECHANICAL PRESS

[75] Inventors: Mitsuo Sato, Kanagawa; Yuu Takahashi, Tokyo, both of Japan

[73] Assignee: Aida Engineering, Ltd.

[21] Appl. No.: 416,220

[22] Filed: Sep. 9, 1982

[30] Foreign Application Priority Data

Mar. 16, 1982 [JP] Japan ................................. 57-41156

[51] Int. Cl.³ ........................ F16H 21/22; G05G 1/00
[52] U.S. Cl. ............................................. 74/44; 74/591
[58] Field of Search ................. 74/25, 44, 591, 603, 74/573 R, 604

[56] References Cited

U.S. PATENT DOCUMENTS

| 1,165,221 | 10/1958 | Vyzkumny | 74/603 |
| 1,595,785 | 8/1926 | Jackson | 74/604 |
| 2,214,921 | 9/1940 | Criswell | 74/604 |
| 2,280,384 | 4/1942 | Dickson | 74/604 |
| 3,776,046 | 12/1973 | Jones | 74/50 |
| 3,830,212 | 8/1974 | Seino et al. | 74/603 |

FOREIGN PATENT DOCUMENTS

| 6142 | 1/1982 | Japan | 74/603 |
| 26038 | of 1911 | United Kingdom | 74/604 |
| 1445009 | 8/1976 | United Kingdom | 74/603 |

Primary Examiner—Lawrence J. Staab
Assistant Examiner—Michael J. Gonet
Attorney, Agent, or Firm—Toren, McGeady and Stanger

[57] ABSTRACT

In a balance device for a mechanical press, a press body or frame rotatably mounts a crankshaft. A slide is supported from the crankshaft by connecting rods so that it reciprocates transverse to the axial direction of the crankshaft as the shaft is rotated. To avoid the development of an oscillating effect in the press body during operation a first gear is positioned on the crankshaft. Balancing gears are supported on the press body in meshed engagement with the first gear. Each of the first gear and the balancing gears has a balance weight for counteracting the tendency of the slide to cause oscillation and vibrations in the press body.

6 Claims, 4 Drawing Figures

BALANCE DEVICE FOR A MECHANICAL PRESS

SUMMARY OF THE INVENTION

The present invention is directed to a balance device for a mechanical press and more particularly to a vibration suppression device for the type of press in which the slide or ram is driven by a crank mechanism.

In crank-driven mechanical presses, when the slide reciprocates, oscillations develop, due to the eccentric action of the crank, with the result that the entire press vibrates. Such vibration of the press is not only disadvantageous to the precision of the goods produced and to the effective lifetime of the press dies, but it also is a major contributing cause to deteriorating working conditions at the location of the press. In especially high-speed punch presses where the number of slide strokes for large-size presses is in the range of 200-300 SPM (stroke/min.) and for small size presses in the range of 400-500 SPM, the vibration of the press is more pronounced and, as a result, the disadvantages are more numerous.

The simplest way to prevent vibration is to position a crank part opposite to the crankshaft and to provide a slide for each crank so as to equalize their mass and achieve a balance between them. Such an arrangement, however, is quite wasteful mechanically as well as economically and does not afford a suitable balance device.

The primary object of the present invention is to provide a mechanical press in which the vibration generated by the crank mechanism is pressed so that a smooth operation is attained.

In accordance with the present invention, a balance device in the form of balance gears and balance weights are associated with the crankshaft.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1A:
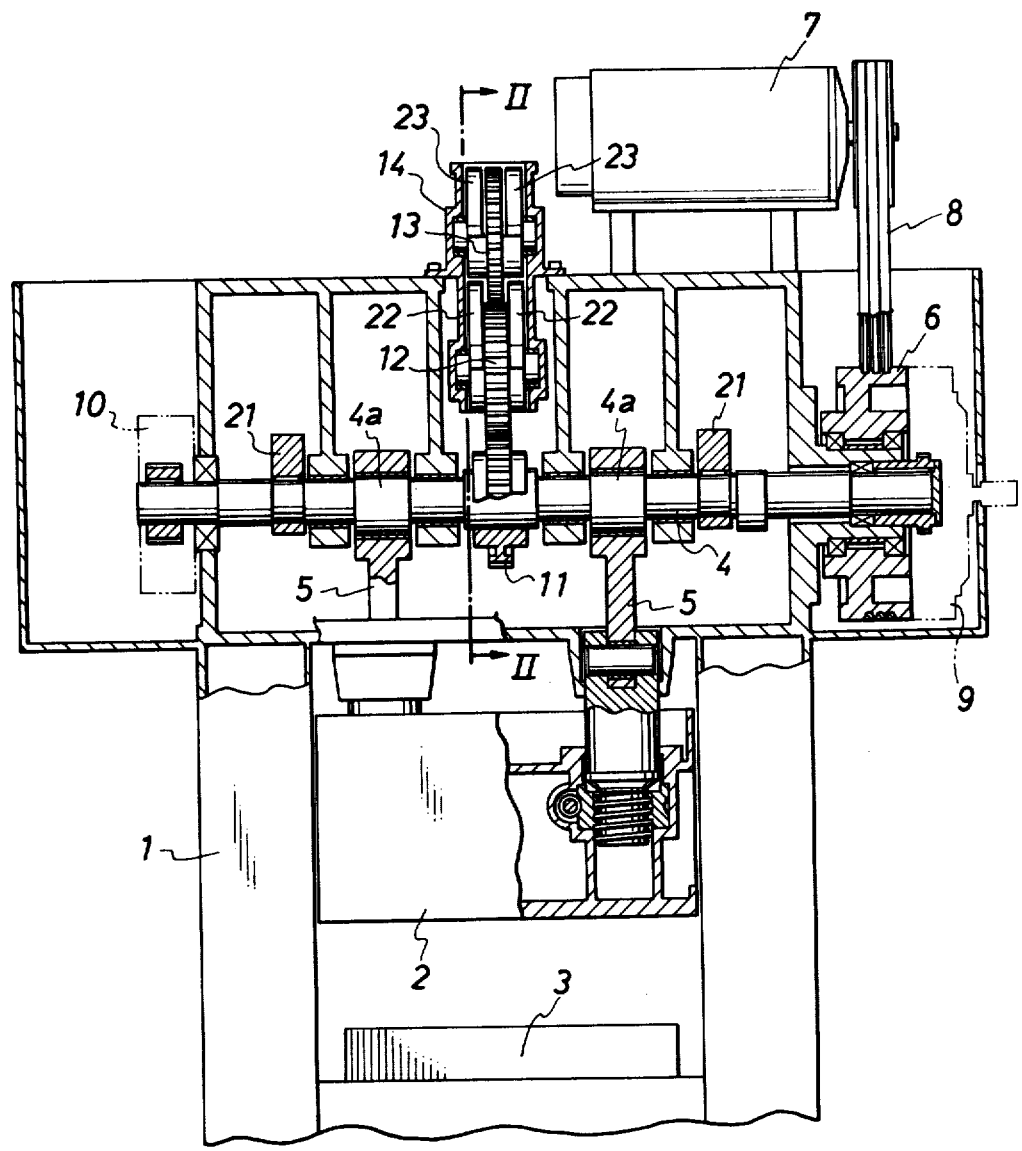
FIG. 1A is a side view, mostly in cross-section, of the entire assembly of a balance device, in accordance with the present invention, mounted on a mechanical press.

The following is a detailed description of the present invention referring to the embodiment illustrated in the drawing.

In a mechanical press body 1, a slide is reciprocal or movable in the up and down direction and a bolster 3 is provided below and faces toward the slide. Lower dies, not shown, are mounted on the bolster 3 while upper dies, not shown, are located on the slide 2 for a press operation.

A crankshaft 4 is rotatably mounted in the press body 1 and extends transversely of the up and down movement of the slide 2. Eccentric parts 4a are spaced axially apart on the crankshaft 4 and are connected to the slide by connecting rods 5 so that as the crankshaft 4 rotates, the slide 2 reciprocates. On that portion of the press body located at the right-hand end of the crankshaft 4 in FIG. 1, a flywheel 6 is provided which rotates freely around the crankshaft. Flywheel 6 is connected by a V-belt 8 to a pulley on the output shaft of a drive motor 7 supported on the press body 1. A clutch 9, as shown in phantom, is provided between the flywheel 6 and the crankshaft. At the opposite end of the crankshaft, that is the left-hand end in FIG. 1, a brake 10 is mounted on the crankshaft.

Figure 1B:
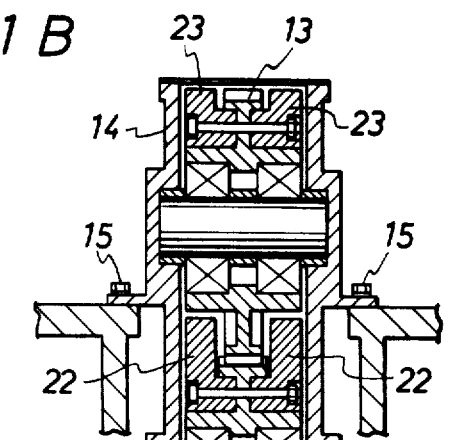
FIG. 1B is a cross-sectional view of the balance gears.

A first gear 11 is positioned on the crankshaft 4 midway between its opposite ends. A second gear 12 is in meshed engagement with and is aligned above the first gear 11 and a third gear 13 is in meshed engagement with the second gear and is aligned above the second gear. These gears are arranged to afford a balancing effect and each has the same number of teeth. A casing 14 is mounted on the press body 1 above the crankshaft 4 and supports a pair of pins which, in turn, each support one of the second and third gears 12, 13. Casing 14 is secured on the press body by bolts 15. As shown in FIG. 1A, balance weights 21 are located on each of the opposite sides of the first gear 11 on the crankshaft 4. As illustrated, the balance weights 21 are spaced outwardly from the eccentric parts 4a. Within the casing 14 balance weights 22, 23 are located on the opposite sides of the second gear 12 and the third gear 13, respectively.

Figure 2:
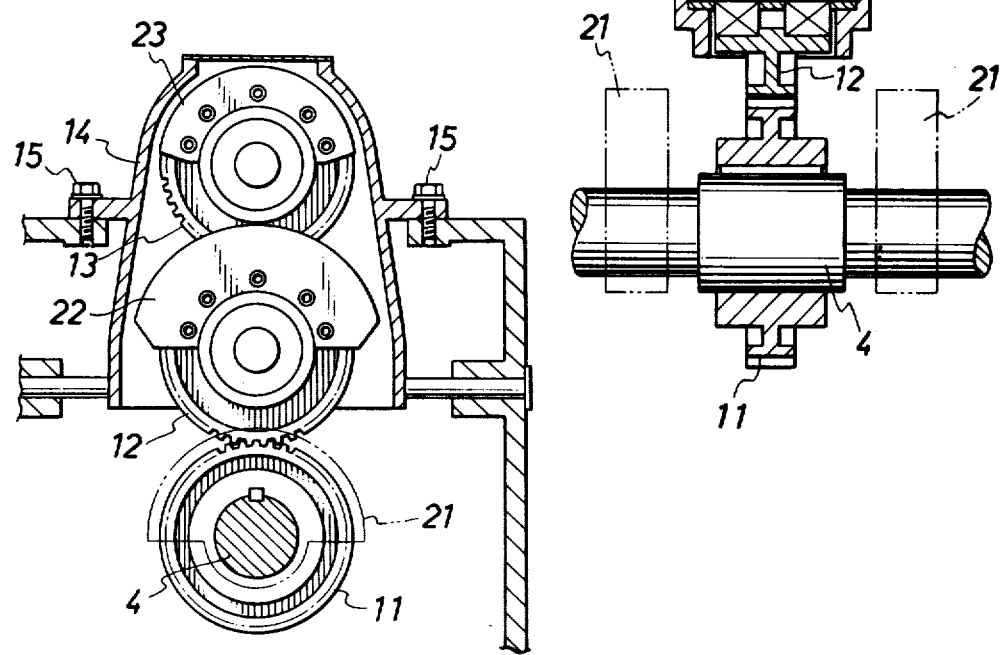
FIG. 2 is a side view of the balance gears.

As illustrated in FIG. 2, each of the balance weights 22, 23 has a half-doughnut shape and they are positioned so they do not interfere with one another as the gears rotate. In the illustrated embodiment, the balance weights 21 are located on the crankshaft 4, however, these balance weights could be mounted directly on the first gear 11 in the same manner as the balance weights 22, 23 are provided on the second and third gears, for affording the same effect.

Figure 3:
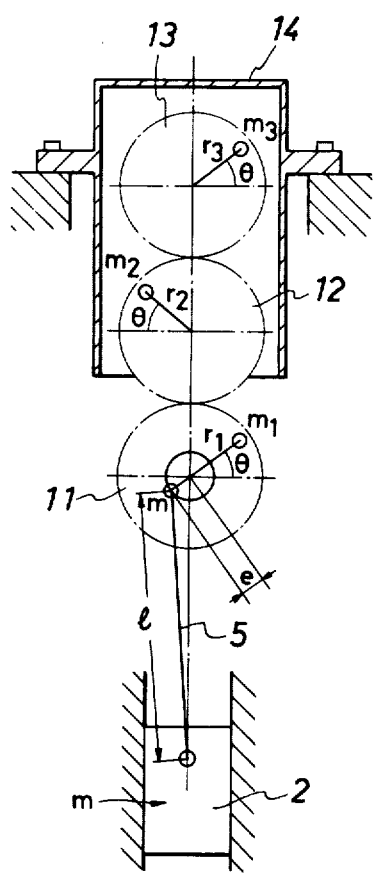
FIG. 3 is a diagram which explains the structure of the balance gears.

In FIG. 3 the arrangement as well as the mass of the balance weights 21, 22, 23 is shown for affording a better understanding of the above-described structure. In FIG. 3, $m_1$, $m_2$, $m_3$ and $r_1$, $r_2$, $r_3$ indicate the mass and the distance from the center of rotation to the center of gravity of the balance weights 21, 22, 23, respectively. Further, m indicates the mass of the slide 4, e the eccentricity of the crankshaft 4, l the length between the fulcra of the connecting rods, and $\theta$ an optional rotating angle. The balance weights 21, 22, 23 are arranged to be in the uppermost position, that is, at top dead center, when the slide is in the bottom dead center position.

In the described embodiment, each member is sized to realize the following:

$$em = r_1 m_1 + r_2 m_2 + r_3 m_3 \tag{1}$$

$$r_1 m_1 = r_3 m_3 = \tfrac{1}{2} r_2 m_2 \tag{2}$$

Now, if the speed of the rotating angle is taken as w, and indicating the oscillating power of each member in the horizontal direction as FH and in the vertical direction as FV under the condition where e/l is quite small, since usually the length of side strokes of a high-speed punch press is short, the following equations are obtained:

$$FH = \omega^2(r_1 m_1 \cos\theta - r_2 m_2 \cos\theta + r_3 m_3 \cos\theta) \tag{3}$$

$$= \omega^2(r_1 m_1 + r_3 m_3 - r_2 m_2)\cos\theta$$

$$FV = \omega^2(-em^{\sin\theta} + r_1 m_1 \sin\theta + r_2 m_2 \sin\theta + r_3 m_3 \sin\theta) \quad (4)$$

$$= \omega^2(-em + r_1 m_1 + r_2 m_2 + r_3 m_3) \sin\theta$$

From the above equations (2) and (3) FH=0 is obtained, while from the equations (1) and (4) FV=0 is obtained. Accordingly, the oscillation or vibration in both the horizontal and vertical directions is balanced and the vibration suppressing effect is attained.

As described above, in the present invention, oscillation or vibration occurring from the crank mechanism is prevented or suppressed, and thus excellent results are achieved, such as an improvement in the precision of the products formed in the press, an extension of the working lifetime of the dies, an improvement in the working environment and a decrease in the abrasion of the bearing.

While specific embodiments of the invention have been shown and described in detail to illustrate the application of the inventive principles, it will be understood that the invention may be embodied otherwise without departing from such principles.

We claim:

1. Balance device for a mechanical press comprising a press body, an axially extending crankshaft rotatably mounted on said press body, connecting rods mounted on and spaced apart in the axial direction of said crankshaft, a slide attached to said connecting rods for reciprocal movement in a direction transverse of the axial direction of said crankshaft, a first gear positioned on said crankshaft for rotation therewith and positioned approximately midway between said slides, a plurality of balancing gears mounted on said press body, each of said balancing gears having the same number of teeth as said first gear with one of said balancing gears in meshed engagement with said first gear and located on the opposite side of said crankshaft from said slides and at least one other said balancing gear is meshed engagement with the one of said balancing gears and located on the opposite side of said one of said balancing gears from said crankshaft, balancing weights connected to each of said first gear and said balancing gears for counteracting the tendency of said slide to cause oscillation and vibration in said press body, and the center of said first gear and said balancing gears being aligned one above the other.

2. Balance device, as set forth in claim 1, including a casing secured to said press body, pins mounted in said casing with said balancing gears positioned on said pins, and said pins being in spaced parallel relation with said crankshaft.

3. Balance device, as set forth in claim 1, wherein said crankshaft extends horizontally and said balancing gears are located above said crankshaft and in parallel relationship and vertical alignment with said first gear.

4. Balance device, as set forth in claim 1, wherein said balancing gears comprise a second gear and a third gear with said second gear in meshed engagement with said first gear and said third gear in meshed engagement with said second gear.

5. Balance device, as set forth in claim 1, wherein said balance weights have a half-doughnut shape and are positioned so that they do not interfere with one another during rotation.

6. Balance device, as set forth in claim 5, wherein two said balance weights are provided for each of said balancing gears with said balance weights disposed on the opposite sides of the associated said balancing gear.

* * * * *